United States Patent
Djuknic et al.

(10) Patent No.: US 10,020,897 B1
(45) Date of Patent: Jul. 10, 2018

(54) PHASED ARRAY TUNING FOR INTERFERENCE SUPPRESSION

(71) Applicant: Rosemount Aerospace Inc., Burnsville, MN (US)

(72) Inventors: Goran Djuknic, New York, NY (US); Sanjay Bajekal, Simsbury, CT (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 15/489,194

(22) Filed: Apr. 17, 2017

(51) Int. Cl.
| | |
|---|---|
| *H04B 1/00* | (2006.01) |
| *H04B 15/00* | (2006.01) |
| *H04B 1/40* | (2015.01) |
| *G01R 29/26* | (2006.01) |
| *G01S 13/88* | (2006.01) |

(52) U.S. Cl.
CPC ............ *H04B 15/00* (2013.01); *G01R 29/26* (2013.01); *G01S 13/882* (2013.01); *H04B 1/40* (2013.01)

(58) Field of Classification Search
None
See application file for complete search history.

(56) References Cited

U.S. PATENT DOCUMENTS

| | | | | |
|---|---|---|---|---|
| 6,914,539 B2* | 7/2005 | Hoctor | ...................... | H04J 1/12 340/870.01 |
| 7,327,323 B2 | 2/2008 | Jackson et al. | | |
| 7,729,431 B2* | 6/2010 | Gebara | .................. | H01Q 1/521 375/259 |
| 8,050,311 B2* | 11/2011 | Larsson | ................. | H04B 7/022 342/353 |
| 8,325,702 B2* | 12/2012 | Michaels | .............. | H04W 72/12 370/347 |
| 8,964,989 B2* | 2/2015 | Grice | .................... | H04L 9/0855 380/256 |
| 9,019,849 B2 | 4/2015 | Hui et al. | | |
| 9,060,290 B2* | 6/2015 | Halbauer | .............. | H04W 74/00 |
| 9,425,839 B2* | 8/2016 | Kazmi | ................ | H04W 52/244 |
| 9,432,854 B2* | 8/2016 | Abinader, Jr. | .... | H04W 72/1215 |
| 9,472,844 B2* | 10/2016 | Kasher | ................. | H04B 7/0617 |
| 9,479,994 B2* | 10/2016 | Zhou | ..................... | H04L 1/1893 |
| 9,578,653 B2* | 2/2017 | Carbonelli | ........... | H04B 7/0456 |
| 9,907,017 B2* | 2/2018 | Chae | ................. | H04W 52/0209 |
| 2013/0142059 A1* | 6/2013 | Di Girolamo | .......... | H04L 12/66 370/252 |
| 2015/0188622 A1 | 7/2015 | Leabman | | |
| 2016/0112111 A1 | 4/2016 | Bull | | |
| 2017/0195939 A1* | 7/2017 | Tujkovic | ............... | H04W 40/16 |
| 2018/0062442 A1* | 3/2018 | Qiu | ........................ | H02J 50/12 |

* cited by examiner

*Primary Examiner* — Tuan A Tran
(74) *Attorney, Agent, or Firm* — Kinney & Lange, P.A.

(57) ABSTRACT

A system has a plurality of transmission-capable nodes. A method is provided for suppressing interference at a critical sensor situated within this system. The system is first three-dimensionally mapped. Next, phase shifts are estimated for transmissions from the nodes to produce net destructive interference at the critical sensor, based on the three-dimensional mapping of the system. An aggregate electromagnetic signal from the nodes is sensed at the critical sensor. The phase shifts are then adjusted based on the sensed aggregate electromagnetic signal.

20 Claims, 2 Drawing Sheets

PHASED ARRAY TUNING FOR INTERFERENCE SUPPRESSION

BACKGROUND

The present disclosure relates generally to a system for reducing sensor interference, and more particularly to a sensor interference suppression system for an aircraft having multiple distributed wireless transceiver nodes.

Distributed aircraft components such as sensors and actuators increasingly communicate with central processors wirelessly. Such components can be distributed spatially across the entire aircraft. Some transmissions may be regularly scheduled, while others can be triggered by specific unscheduled events.

Aircraft ordinarily include at least one altimeter that operates substantially continuously. Altimeters commonly operate by transmitting and receiving an encoded pulse that is reflected off the ground. Time-of-flight of the returning signal is used to determine the aircraft's distance from the ground. Altimeter function is especially critical during ground approaches, e.g. at landing.

Sensor interference from other transceiver nodes can pose a serious impediment to altimeter function. Interference that causes received signals to be corrupted beyond encoding recognition will prevent altimeters from registering return signals, thereby interfering with altimeter function.

SUMMARY

The present disclosure is directed towards a system with a plurality of transmission-capable nodes. A method is provided for suppressing interference at a critical sensor situated within this system. The system is first three-dimensionally mapped. Next, phase shifts are estimated for transmissions from the nodes to produce net destructive interference at the critical sensor, based on the three-dimensional mapping of the system. An aggregate electromagnetic signal from the nodes is sensed at the critical sensor. The phase shifts are then adjusted based on the sensed aggregate electromagnetic signal.

The present summary is provided only by way of example, and not limitation. Other aspects of the present disclosure will be appreciated in view of the entirety of the present disclosure, including the entire text, claims, and accompanying figures.

Figure 1:
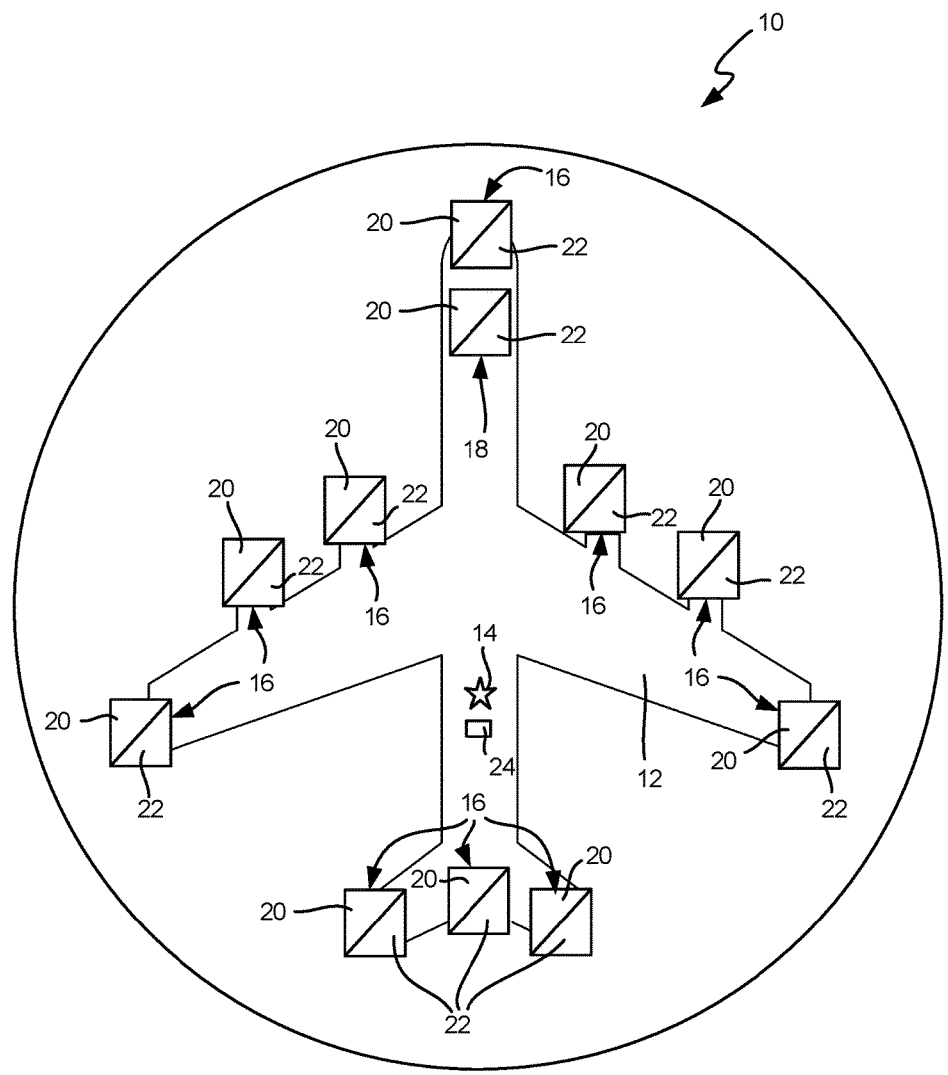
FIG. 1 is a schematic view of a sensor system with several distributed transceiver nodes.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present disclosure concerns a sensor system with a plurality of spatially distributed transceiver nodes. The phase and timing of transmissions from these nodes are adjusted based on their respective locations within the system, so as to produce destructive signal interference at a critical location, thereby suppressing interference with passive sensor function at that critical location.

FIG. 1 is a schematic view of sensor system 10, which includes aircraft 12 with sensor 14, distributed nodes 16, and controller 18. Nodes 16 and controller 18 each include a transceiver 20 and a phase shifter 22. FIG. 1 additionally illustrates critical location signal sensor 24, an interference sensor at least transiently located near sensor 14 during a configuration process, as discussed in greater detail below. As described herein, sensor system 10 is assumed to be an aircraft sensor system. More generally, however, the principles set out in the present disclosure can be applied to any system having a plurality of spatially distributed transceiver nodes, and in which the suppression of interference at a particular location or locations is of critical importance.

Sensor 14 is a sensor to be protected from interference caused by nodes 16, and can for example be an altimeter that regularly emits encoded radiation pulses towards the earth, detects and recognizes those pulses when they are reflected from the surface, and determines aircraft altitude based on time-of-flight of the pulses. In the most general case, however, sensor 14 is a critical sensor at a fixed, known location within sensor system 10. Sensor 14 is sensitive to electromagnetic interference from nodes 16.

Nodes 16 are devices or elements distributed across aircraft 12, and wirelessly coupled to controller 18. Nodes 16 can, for example, be transducers (e.g. sensors or actuators) wirelessly connected to controller 18. More generally, nodes 16 can be any elements that regularly transmit wireless signals from fixed, known locations within aircraft 12. Nodes 16 can be bi- or multi-directional transceivers each coupled to a separate device on aircraft 12. In some embodiments, nodes 16 can form a mesh network, and may communicate with each other. Nodes 16 can be associated with sensor nodes such as engine or wing sensor systems, proximity sensors, temperature and/or pressure sensors, fire and/or smoke sensors, and attitude (orientation) sensors.

Controller 18 is a wireless-enabled data collector such as a data aggregator and/or processor that sends and/or receives transmission to and/or from nodes 16. Controller 18 can, for example, be a component of an aircraft control processor or monitoring system. In the most general embodiment, controller 18 is a wireless-capable component that connects to and coordinates transmissions between itself, sensor 14, and nodes 16. Although only one controller 18 is illustrated in FIG. 1, some embodiments of sensor system 10 can include multiple controllers.

Nodes 16 and controller 18 are depicted as each having transceiver 20 and phase shifter 22. Although not shown, controller 18 and each node 16 also include other application-specific hardware. Controller 18, for example, includes machine readable memory and data processing hardware. Nodes 16 can, for example, have actuator or sensor hardware as described above, as well as local memory and/or processing hardware as necessary. Transceivers 20 transmit and receive wireless signals on a common frequency band. Sensor 14 is sensitive to frequencies within this band, or overlapping with this band. In one embodiment, sensor 14, nodes 16, and controller 18 share the 4.2-4.6 GHz frequency band. Because of this common frequency band, transmissions between nodes 16 and controller 18 can interfere with operation of sensor 14, potentially causing data loss or corruption for sensor 14. The presently disclosed system mitigates this interference, improving the reliability of sensor 14.

Nodes 16 collectively make up a phased array system with a radiation pattern controlled by phase shifting of transmissions from transceivers 20 of nodes 16 and controller 18 via phase shifters 22. As will be described in greater detail below with respect to FIG. 2, controller 18 adjusts phase shifters 22 to achieve an aggregate radiation pattern from all transceivers 20 that produces destructive interference at sensor 14 between simultaneous transmissions, thereby suppressing interference with sensor 14.

Figure 2:
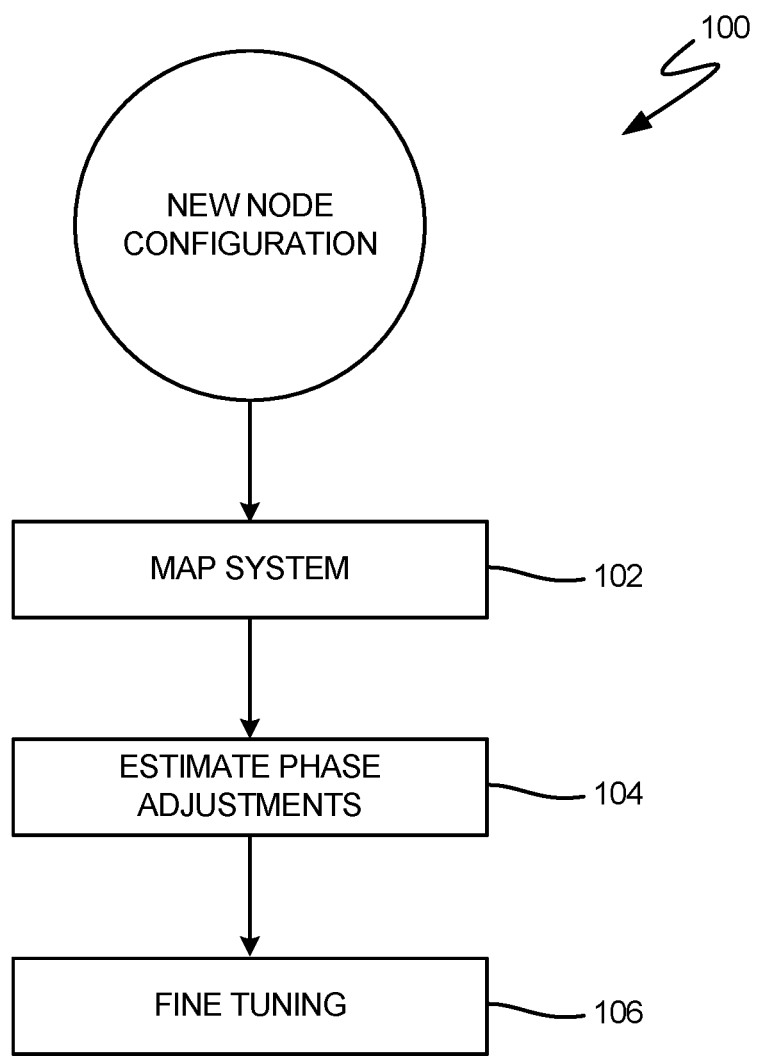
FIG. 2 is a flowchart describing a method for suppressing sensor interference in the aircraft system of FIG. 1.

FIG. 2 is a flowchart illustrating method 100, a configuration method whereby net signal interference at sensor 14 from nodes 16 and controller 18 is minimized. The illustrated method has three primary steps 102, 104, and 106. First, the entirety of sensor system 10 is mapped to identify the precise three-dimensional spatial positions of sensor 14, of each node 16, and of processor 18 within aircraft 12. (Step 102). More specifically, where nodes 16 and processor 18 include multiple or distributed elements, the locations of transceivers 22 are mapped for each element. In addition to nodes 16 and controller 18, signal-affecting background structures or geometries of aircraft 12 can be identified and located. This mapping can be performed on a case-by-case basis for each system, or can be generally mapped for a class of sufficiently similar systems (e.g. all aircraft of a particular model). In some embodiments, a common mapping for some element or structures of sensor system 10 can be supplemented with adjustments or additions idiosyncratic to a particular system.

Once sensor system 10 has been mapped, phase adjustments or offsets are calculated to produce net destructive interference at the location of sensor 14. (Step 104). Nodes 16 and controller 18 together constitute a phased array. By adjusting phases of transmissions from each element of this array (via phase shifters 22), the expected received aggregate signal at sensor 14 can be minimized. This adjustment can, for example, involve predicting the phase offset between sensor 14 and each other element (controller 18 and nodes 16) either analytically or by simulation. In a simplest case, phase offset can be a simplified as purely a function of distance between sensor 14 and each transmitting element of sensor system 10. More nuanced analyses can account for refraction and attenuation of signals due to background structure of aircraft 12. Net signal at sensor 14 from all active elements of sensor system 12 is minimized by selecting phases of sensors to destructively interfere at sensor 14.

In some cases, processor 18 and nodes 16 are simultaneously active (i.e. transmitting). Here, signal cancelling at sensor 14 is accomplished by simultaneously aggregating expected signal strength from all active elements, and tuning at least a subset of processor 18 and/or nodes 16 to adjust this aggregate expected signal. In other embodiments, however, only a subset of nodes 16 and processor 18 are normally active at any given time. For example, sensor system 10 may follow a schedule whereby some or all nodes 16 transmit only intermittently, or may perform transmissions involving preset subsets of nodes 16 in response to triggering events. Where not all transmitting elements are expected to be simultaneously active, phase adjustments must be separately estimated for each subset of processor 18 and nodes 16 expected to transmit simultaneously. In some cases, "dummy" transmissions can be scheduled or requested from nodes 16 in order to minimize net signal at sensor 14 (i.e. to interfere destructively with other signals), even when transmission from those nodes is not required for data transfer. In addition to a phase shift supplied by each phase shifter 22, transmission amplitude from each transceiver 22 can be adjusted to minimize interference, so long as amplitude remains sufficient to communicate with controller 18. Not all transmission-capable elements of sensor system 10 need by capable of adjustment according to the present system, so long as adjustment of other elements is sufficient to cancel interference from non-adjustable elements.

The phase adjustment estimation in step 104 is unlikely to precisely account for all factors affecting signal reception at sensor 14. Simulation and analytical methods for estimating phase adjustments can use detailed EM models of aircraft 12, but these models and the methods that utilize them are, by necessity, approximations. Consequently, phase adjustments estimated in step 104 are iteratively fine-tuned based on actual aggregate signal interference measured at sensor 14 by critical location signal sensor 24. (Step 106). Critical location signal sensor 24 is situated at the actual location of sensor 14 once all elements of sensor system 12 are in their final spatial position and set into operation. Critical location signal sensor 24 reports actual signal interference at sensor 14. Phase shifts of each node 16 are then varied until no aggregate signal above a specified threshold is received by critical location signal sensor 24, for each subset of simultaneously transmitting elements. This threshold is selected based on the sensitivity of the radio receiver of sensor 14. In particular, the threshold is selected to be lower than a sensitivity of the radio receiver, such that interference of a magnitude less than the threshold value is insignificant to signal reception. This fine tuning via variation in phase shifts in sensor nodes can be performed according to a deterministic, stochastic, or artificial intelligence algorithm, with the goal of creating a null in the aggregate electromagnetic radiation pattern of transmitting portions of sensor system 10 at sensor 14.

In some embodiments the aforementioned mapping, phase adjustment, and fine tuning processes (steps 102, 104, and 106) can be performed by controller 18. In other embodiments, however, the processing involved in these steps can be outsourced to an external device only transiently interactive with sensor system 10. Once phases of elements within system 10 are configured, no reconfiguration is necessary unless or until elements (e.g. nodes 16, controller 18) are moved, added, or removed. Consequently, some embodiments of the present invention may use hardware external to sensor system 10 to perform (but not to subsequently benefit from) method 100. Critical location signal sensor 24, for example, can be a temporary device only inserted within sensor system 10 for the duration of phase-array configuration to minimize interference, and then removed. Removable components can be reused in the configuration of multiple systems.

Some alternative embodiments of the present system can include a permanently installed critical location signal sensor 24. This architecture allows adaptive control of sensor system 10 in response to unanticipated changes in active node position. If a physical configuration of nodes 16 within sensor network 10 is changed due to nodes being added and/or removed, or due to failures preventing some nodes from transmitting, a permanently installed critical location signal sensor 24 allows sensor system 10 recover (i.e. reestablish signal cancellation at sensor 14) by reimplementing steps 104 and 106. For example, some aircraft systems can include paired or grouped sets of alternative nodes. In such cases, a secondary node may be activated only in the event of failure of a primary node. Such a change in node activation can necessitate reconfiguration of transmission phase shifts and/or amplitude to suppress interference at sensor 14.

The invention disclosed above provides a system and method for suppressing interference at a sensor location within a wireless network. Each transmitting component of sensor system 10 acts as a phased array element. Phases and amplitudes of transmissions from these elements are adjusted based on predicted behavior (via analytical or simulation modeling) of sensor system 10, so as to minimize interference at sensor 14. Initial conditions set based on this predicted behavior are then fine-tuned based on sensed signal interference to further improve interference cancellation.

Discussion of Possible Embodiments

The following are non-exclusive descriptions of possible embodiments of the present invention.

A method for suppressing interference at a critical sensor situated within a system having a plurality of transmission-capable nodes, the method comprising: three-dimensionally mapping the system; estimating phase shifts for transmissions from the nodes to produce net destructive interference at the critical sensor, based on the three-dimensional mapping of the system; sensing aggregate electromagnetic signal from the nodes at the critical sensor; and adjusting the phase shifts based on the sensed aggregate electromagnetic signal.

The method of the preceding paragraph can optionally include, additionally and/or alternatively, any one or more of the following features, configurations and/or additional components:

A further embodiment of the foregoing method, wherein three-dimensionally mapping the system comprises identifying a three-dimensional location of the critical sensor and of each of the plurality of transmission-capable nodes within the system.

A further embodiment of the foregoing method, wherein three-dimensionally mapping the system further comprises three-dimensionally mapping background structures capable of signal refraction or attenuation.

A further embodiment of the foregoing method, wherein adjusting the phase shifts based on the sensed aggregate electromagnetic signal is performed according to an algorithm selected from a group consisting of deterministic algorithms, stochastic algorithms, artificial intelligence algorithms, and combinations of deterministic, stochastic, and artificial intelligence algorithms.

A further embodiment of the foregoing method, wherein sensing aggregate electromagnetic signal and adjusting the phase shifts based on the sensed aggregate electromagnetic signal comprise iteratively adjusting a phase shift of at least one of the nodes, and sensing resulting aggregate electromagnetic signal at the sensor, until the aggregate electromagnetic signal is less than a threshold value selected based on a sensitivity of the critical threshold.

A further embodiment of the foregoing method, wherein sensing aggregate electromagnetic signal comprises positioning a temporary critical location interference sensor at a location of the critical sensor, the method further comprising: removing the temporary critical location interference sensor after adjusting the phase shifts based on the sensed aggregate electromagnetic signal.

A further embodiment of the foregoing method, wherein the sensor is an altimeter that operates by emitting encoded electromagnetic pulses, receiving reflections of the encoded electromagnetic pulses, and measuring a time-of-flight between emission and reception of the encoded electromagnetic pulses.

A further embodiment of the foregoing method, further comprising: identifying a plurality of subsets of the nodes expected to be simultaneously active, and wherein the steps of three-dimensionally mapping the system, estimating phase shifts, sensing aggregate electromagnetic signal, and adjusting the phase shifts based on the sensed aggregate electromagnetic signal are all performed separately for each subset of the nodes expected to be simultaneously active.

A further embodiment of the foregoing method, wherein for at least some of the subsets of nodes, estimating phase shifts from the nodes to produce net destructive interference at the critical sensor comprises providing dummy transmissions from one of the plurality of nodes outside of that subset of nodes, such that the dummy transmissions and transmissions from that subset of nodes destructively interfere at the critical sensor.

A further embodiment of the foregoing method, further comprising selecting amplitudes for transmissions from the nodes together with phase shifts, so as to produce net destructive interference at the critical sensor.

A sensor system comprising: a critical sensor; a plurality of transmission-capable nodes, the transmission-capable nodes comprising: a wireless controller; and a wireless node in communication with the controller; wherein interference is suppressed at the critical sensor the according to the method of claim 1.

A sensor system comprising: a critical sensor; a plurality of transmission-capable nodes, the transmission-capable nodes comprising: a wireless controller; and a wireless node in communication with the controller; wherein interference is suppressed at the critical sensor the according to the method of claim 1.

The sensor system of the preceding paragraph can optionally include, additionally and/or alternatively, any one or more of the following features, configurations and/or additional components:

A further embodiment of the foregoing sensor system, wherein the wireless controller and the wireless node communicate on an electromagnetic frequency band shared by the critical sensor.

A further embodiment of the foregoing sensor system, wherein the frequency band is 4.2-4.6 GHz.

A further embodiment of the foregoing sensor system, wherein the sensor system is situated on an aircraft.

A further embodiment of the foregoing sensor system, wherein the steps of estimating phase shifts for transmissions from the nodes, and adjusting the phase shifts based on the sensed aggregate electromagnetic signal are performed by the wireless controller.

A further embodiment of the foregoing sensor system, further comprising a critical location interference sensor situated at the critical sensor, and wherein the step of sensing aggregate electromagnetic signal from the nodes at the critical sensor is performed by the critical location interference sensor.

A further embodiment of the foregoing sensor system, wherein the critical location interference sensor is a temporary sensor present in the sensor system only for the duration of the method.

A further embodiment of the foregoing sensor system, wherein the critical location interference sensor is a permanent sensor situated at the critical sensor at all times.

A further embodiment of the foregoing sensor system, wherein the method further comprises detecting changes in positions of the nodes using the permanent critical location interference sensor.

A further embodiment of the foregoing sensor system, wherein the steps of estimating phase shifts for transmissions from the nodes, sensing aggregate electromagnetic signal from the nodes, and adjusting the phase shifts based on the sensed aggregate electromagnetic signal are all reinitiated upon detection of a change in position of the nodes.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for suppressing interference at a critical sensor situated within a system having a plurality of transmission-capable nodes, the method comprising:
   three-dimensionally mapping the system;
   estimating phase shifts for transmissions from the nodes to produce net destructive interference at the critical sensor, based on the three-dimensional mapping of the system;
   sensing aggregate electromagnetic signal from the nodes at the critical sensor; and
   adjusting the phase shifts based on the sensed aggregate electromagnetic signal.

2. The method of claim 1, wherein three-dimensionally mapping the system comprises identifying a three-dimensional location of the critical sensor and of each of the plurality of transmission-capable nodes within the system.

3. The method of claim 2, wherein three-dimensionally mapping the system further comprises three-dimensionally mapping background structures capable of signal refraction or attenuation.

4. The method of claim 1, wherein adjusting the phase shifts based on the sensed aggregate electromagnetic signal is performed according to an algorithm selected from a group consisting of deterministic algorithms, stochastic algorithms, artificial intelligence algorithms, and combinations of deterministic, stochastic, and artificial intelligence algorithms.

5. The method of claim 1, wherein sensing aggregate electromagnetic signal and adjusting the phase shifts based on the sensed aggregate electromagnetic signal comprise iteratively adjusting a phase shift of at least one of the nodes, and sensing resulting aggregate electromagnetic signal at the sensor, until the aggregate electromagnetic signal is less than a threshold value selected based on a sensitivity of the critical threshold.

6. The method of claim 1, wherein sensing aggregate electromagnetic signal comprises positioning a temporary critical location interference sensor at a location of the critical sensor, the method further comprising:
   removing the temporary critical location interference sensor after adjusting the phase shifts based on the sensed aggregate electromagnetic signal.

7. The method of claim 1, wherein the sensor is an altimeter that operates by emitting encoded electromagnetic pulses, receiving reflections of the encoded electromagnetic pulses, and measuring a time-of-flight between emission and reception of the encoded electromagnetic pulses.

8. The method of claim 1, further comprising:
   identifying a plurality of subsets of the nodes expected to be simultaneously active, and
   wherein the steps of three-dimensionally mapping the system, estimating phase shifts, sensing aggregate electromagnetic signal, and adjusting the phase shifts based on the sensed aggregate electromagnetic signal are all performed separately for each subset of the nodes expected to be simultaneously active.

9. The method of claim 8, wherein for at least some of the subsets of nodes, estimating phase shifts from the nodes to produce net destructive interference at the critical sensor comprises providing dummy transmissions from one of the plurality of nodes outside of that subset of nodes, such that the dummy transmissions and transmissions from that subset of nodes destructively interfere at the critical sensor.

10. The method of claim 1, further comprising selecting amplitudes for transmissions from the nodes together with phase shifts, so as to produce net destructive interference at the critical sensor.

11. A sensor system comprising:
    a critical sensor;
    a plurality of transmission-capable nodes, the transmission-capable nodes comprising:
        a wireless controller; and
        a wireless node in communication with the controller;
    wherein interference is suppressed at the critical sensor the according to the method of claim 1.

12. The sensor system of claim 11, wherein the wireless controller and the wireless node communicate on an electromagnetic frequency band shared by the critical sensor.

13. The sensor system of claim 12, wherein the frequency band is 4.2-4.6 GHz.

14. The sensor system of claim 11, wherein the sensor system is situated on an aircraft.

15. The sensor system of claim 11, wherein the steps of estimating phase shifts for transmissions from the nodes, and adjusting the phase shifts based on the sensed aggregate electromagnetic signal are performed by the wireless controller.

16. The sensor system of claim 11, further comprising a critical location interference sensor situated at the critical sensor, and wherein the step of sensing aggregate electromagnetic signal from the nodes at the critical sensor is performed by the critical location interference sensor.

17. The sensor system of claim 16, wherein the critical location interference sensor is a temporary sensor present in the sensor system only for the duration of the method.

18. The sensor system of claim 17, wherein the critical location interference sensor is a permanent sensor situated at the critical sensor at all times.

19. The sensor system of claim 18, wherein the method further comprises detecting changes in positions of the nodes using the permanent critical location interference sensor.

20. The sensor system of claim 19, wherein the steps of estimating phase shifts for transmissions from the nodes, sensing aggregate electromagnetic signal from the nodes, and adjusting the phase shifts based on the sensed aggregate electromagnetic signal are all reinitiated upon detection of a change in position of the nodes.

* * * * *